(12) United States Patent
Xu

(10) Patent No.: US 7,082,779 B2
(45) Date of Patent: Aug. 1, 2006

(54) GEOTHERMAL HEAT ACCUMULATOR AND AIR-CONDITIONING USING IT

(76) Inventor: Shengheng Xu, Beijing Ever Source Science & Technology Development Co. Ltd. No. 36, Xingshikou Road, Haidian district Beijing 100089 (CN)

( * ) Notice: Subject to any disclaimer, the term of this patent is extended or adjusted under 35 U.S.C. 154(b) by 431 days.

(21) Appl. No.: 10/477,694

(22) PCT Filed: Apr. 25, 2002

(86) PCT No.: PCT/CN02/00292

§ 371 (c)(1),
(2), (4) Date: Nov. 14, 2003

(87) PCT Pub. No.: WO03/001126

PCT Pub. Date: Jan. 3, 2003

(65) Prior Publication Data

US 2004/0144115 A1 Jul. 29, 2004

(30) Foreign Application Priority Data

May 15, 2001 (CN) .......................... 01116085 A
Mar. 6, 2002 (CN) .......................... 02104032 A

(51) Int. Cl.
*F25D 23/12* (2006.01)

(52) U.S. Cl. ........................ 62/260; 62/324.1; 165/45
(58) Field of Classification Search ............ 62/260, 62/324.1; 165/45; 126/428, 421
See application file for complete search history.

(56) References Cited

U.S. PATENT DOCUMENTS 4,255,936 A * 3/1981 Cochran .................... 62/238.7
4,392,531 A * 7/1983 Ippolito ...................... 166/278

* cited by examiner

*Primary Examiner*—Melvin Jones
(74) *Attorney, Agent, or Firm*—Greer, Burns & Crain, LTD

(57) ABSTRACT

A geothermal accumulator and a air-conditioning system using the geothermal accumulator, said geothermal accumulator includes a well pipe and a heat-accumulating pipe inserted within the well pipe coaxially, the lower portion and the upper portion of the well pipe are provided with inlet holes and outlet holes for underground water respectively, said heat-accumulating pipe is provided with a water-collecting chamber, a diffluent chamber, a heat-exchanging chamber and a water-accumulating chamber from the bottom up in sequence, the heat-exchanging chamber is provided with a plurality of axially disposed heat-exchanging pipes communicating with the diffluent chamber and water-accumulating chamber respectively, and a plurality of baffles attached to the outside of the heat-exchanging pipes, gap exists between the baffles and the heat-exchanging pipes, the upper portion of the heat-exchanging chamber is connected with a returning pipe, and the lower portion is connected with a discharging pipe, water inlet holes and drain holes are provided respectively in the side wall of the water-collecting chamber and the water-accumulating chamber. Said geothermal accumulator can be used in air conditioner system.

12 Claims, 5 Drawing Sheets

GEOTHERMAL HEAT ACCUMULATOR AND AIR-CONDITIONING USING IT

TECHNICAL FIELD

The present invention relates to air-conditioning system, especially to an air-conditioning system using an accumulator to collect geothermal heat for air conditioning.

BACKGROUND ART

At present, besides coal, natural gas and petroleum, people use solar energy as energy sources, but the utilization of solar energy is impacted by the weather and there are certain limitations. On the other hand, the resources of coal, natural gas and petroleum have limited reserves, and a large massive of residue, dust or waste gas produced when burning not only pollute the environment but also change the atmosphere properties and thus result in greenhouse effect. Great deals of low level cold or heat sources are stored in the earth, river, lake and sea. The present inventor has filed two international applications for utilization of low level cold or heat sources, one is PCT/CN01/00062 filed on Jan. 18, 2001, and priority date of which is Aug. 18, 2000, title of which is "Liquid Air-Conditioner of Geothermal Energy type"; the another one is PCT/CN01/00063, title of which is "Well-Water-Type Liquid Cooling and Heating Resource System". This application is a continuation of above two applications.

Content of the Invention

The purpose of the present invention is to provide a geothermal heat accumulator that can collect underground low level cold or heat energy, and an air-conditioning system of accumulating geothermal heat heat, using the accumulator, which collects the geothermal heat as energy. The system has no pollution and it occupies less room.

A geothermal accumulator, it includes a well pipe and a heat-accumulating pipe inserted within the well pipe coaxially, the lower portion and the upper portion of the well pipe are provided with inlet holes and outlet holes for underground water respectively, said heat-accumulating pipe is provided with a water-collecting chamber, a diffluent chamber, a heat-exchanging chamber and a water-accumulating chamber from the bottom up in sequence, a submergible pump is provided in the water-collecting chamber and is communicated with lower portion of the diffluent chamber by pipelines, the heat-exchanging chamber is provided with a plurality of axially disposed heat-exchanging pipes communicating with the diffluent chamber and water-accumulating chamber respectively, and a plurality of baffles attached to the outside of the heat-exchanging pipes, the peripheries of the baffles are fixed to the inside wall of the heat-accumulating pipe, gap exists between the baffles and the heat-exchanging pipes, the upper portion of the heat-exchanging chamber is connected with a returning pipe, and the lower portion is connected with a discharging pipe, water inlet holes and drain holes are provided respectively in the side wall of the water-collecting chamber and the water-accumulating chamber, an isolating ring is provided between the well pipe and the heat-accumulating pipe and is located at the conjunction of the water-collecting chamber and the heat-exchanging chamber.

A geothermal accumulator, in which it includes a well pipe and a heat-accumulating pipe inserted within said well pipe coaxially, inlet holes are provided respectively in the side walls of lower portion of said well pipe and the heat-accumulating pipe, said heat-accumulating pipe is provided with a water-collecting chamber, a diffluent chamber, a heat-exchanging chamber and a water-accumulating chamber from the bottom up in sequence, a submergible pump is provided in the water-collecting chamber and is communicated with lower portion of the diffluent chamber by a pipeline, the heat-exchanging chamber is provided with a plurality of axially disposed heat-exchanging pipes communicated with the diffluent chamber and water-accumulating chamber respectively, and a plurality of baffles attached to the outside of the heat-exchanging pipes, the peripheries of said baffles are fixed to inside wall of the heat-accumulating pipe, gap exists between the baffles and the heat-exchanging pipes, the upper portion of the heat-exchanging chamber is connected with a returning pipe, and the lower portion is communicated with a discharging pipe, an isolating ring 1111 is provided between the well pipe and the heat-accumulating pipe and is located at the conjunction of the water-collecting chamber and the heat-exchanging chamber, a drainpipe is provided above said water-accumulating chamber and is communicated with the return water tank which position side by side with the well pipe, drain holes are provided in the lower sidewall of the return water tank.

A air-conditioning system of accumulating geothermal heat using the geothermal accumulator of above described, it includes: said geothermal heat accumulator located underground, a heat exchanger, an energy lift device, a discharging pump, a returning pump and an air-conditioner, a discharging pump of the accumulator is provided in the discharging pipe which is connected with the inlet side of the heat exchanger, said energy lift device includes a heating cycle and a heat-exchanging cycle, the heating cycle consists of a compressor, a condenser, a liquid reservoir, a drying filter, a restriction choke, an evaporator and a gas-liquid separator connected by pipelines in sequence, a discharging pipe in the heat exchange cycle coupling with the condenser is connected with the air-conditioner through the liquid inlet pipe of the air-conditioner and the discharging pump, the returning pipe of said air-conditioner is connected with the liquid inlet pipe coupling with said condenser in the heat exchange cycle, the discharging pipe coupling with said evaporator in the heat-exchanging cycle is connected with the returning pipe at the outlet side of said heat exchanger through the returning pump, the discharging pipe at the outlet side of the heat exchanger is connected with the liquid inlet pipe coupling with the evaporator in the heat exchange cycle.

The air-conditioning system of accumulating geothermal heat as described above, in which said energy lift device further includes a water heater, a liquid inlet pipe of said water heater is connected with the discharging pipe of the compressor, the discharging pipe of said water heater is connected with the liquid inlet pipe of the condenser, said water heater is contained in a heat-insulating housing, said housing is further provided with a water supply inlet pipe and a hot water outlet pipe.

The air-conditioning system of accumulating geothermal heat as described above, in which a portion of the inlet pipe within said heater is formed as a helix pipe, said helix inlet pipe is provided around a self-circular boiled water unit having inlet and outlet pipes.

The air-conditioning system of accumulating geothermal heat according to any one described above, in which the system further includes two two-position-four-way valves, the discharging pipe coupling with said condenser in the heat exchange cycle is connected with a first joint of the first two-position-four-way valve, the liquid inlet pipe is connected with a first joint of the second two-position-four-way valve; the liquid inlet pipe of the air-conditioner is connected with the second joint of the first two-position-four-way valve; the returning pipe of the air-conditioner is connected with the fourth joint of the second two-position-four-way valve; a discharging pipe coupling with the evaporator in the heat-exchanging cycle is connected with a third joint of the first two-position-four-way valve, a liquid inlet pipe is connected with a third joint of the second two-position-four-way valve; the liquid inlet pipe at the outlet side of said heat exchanger is connected with the fourth joint of the first two-position-four-way valve, the discharging pipe is connected with the second joint of the second two-position-four-way valve.

The air-conditioning system of accumulating geothermal heat as described above, in which the system further includes a solar energy collector, said solar energy collector includes a solar water heater, a solar energy reservoir and a circulating pump connected by pipelines in sequence to form a cycle, an inlet stop valve and an outlet stop valve is arranged in the inlet pipe and outlet pipe of the solar energy reservoir respectively, a heat exchanger is provided in the solar energy reservoir, an inlet pipe and an outlet pipe of the heat exchanger are connected in parallel with the discharging pipe at the outlet side of the heat exchanger, a heat exchanger inlet stop valve is connected with the inlet pipe.

The air-conditioning system of accumulating geothermal heat as described above, in which the solar water heater is connected with an inlet pipe for water supply and an outlet pipe for domestic hot water, a water supply stop valve and a hot water outlet stop valve are provided in the inlet pipe and the outlet pipe respectively.

The air-conditioning system of accumulating geothermal heat as described above, in which the system also includes an electrical water heater, said electrical water heater includes a transducer, an inlet pipe and outlet pipe of said transducer are connected in parallel with the discharging pipe on the outlet side of the heat exchanger, an inlet stop valve is provided in the inlet pipeline of said transducer.

The air-conditioning system of accumulating geothermal heat as described above, in which a waste-heat heater is located in the electrical water heater, the inlet and outlet pipeline are connected in parallel with the liquid inlet pipe coupling with said evaporator in the heat-exchanging cycle, a stop valve is in the inlet pipeline or the outlet pipeline of said waste-heat heater.

The air-conditioning system of accumulating geothermal heat as described above, in which portions of the returning pipe and the discharging pipe of heat-accumulating pipe, which extending out of the geothermal accumulator, keep a distance of at least 1 meter from the ground level.

In the air-conditioning system of accumulating geothermal heat according to present invention, the geothermal accumulator is embedded in the ground, which transfers heat with underground water via liquid therein and absorbs energy of water, then uses the heat through the heat exchanger, the energy lift device and the air-conditioner, finally return water to the ground. Therefore, the system has no pollution and is small in size so as to be suitable for the area having dense population in city. The air-conditioning system of accumulating geothermal heat can transfer the low level heat energy in the accumulator to the energy lift device through liquid, then transfer the lift high quality heat energy to the user through liquid. In the winter, the system collects low level heat from the ground (include sensible and latent heat generated when phase transition), but in the summer the system can return the heat to the ground. Therefore, the system is a greatest benign circular device that collects heat from the ground and then returns back. Meanwhile it can supply sanitary hot water for people. The system has no poisonous substance during operation, and has no public nuisance and pollution and having low cost.

Other details and features of the present invention will be clear by referring to the description of the embodiments combining with the attached figures.

BEST MODE OF CARRYING OUT THE INVENTION

Figure 1:
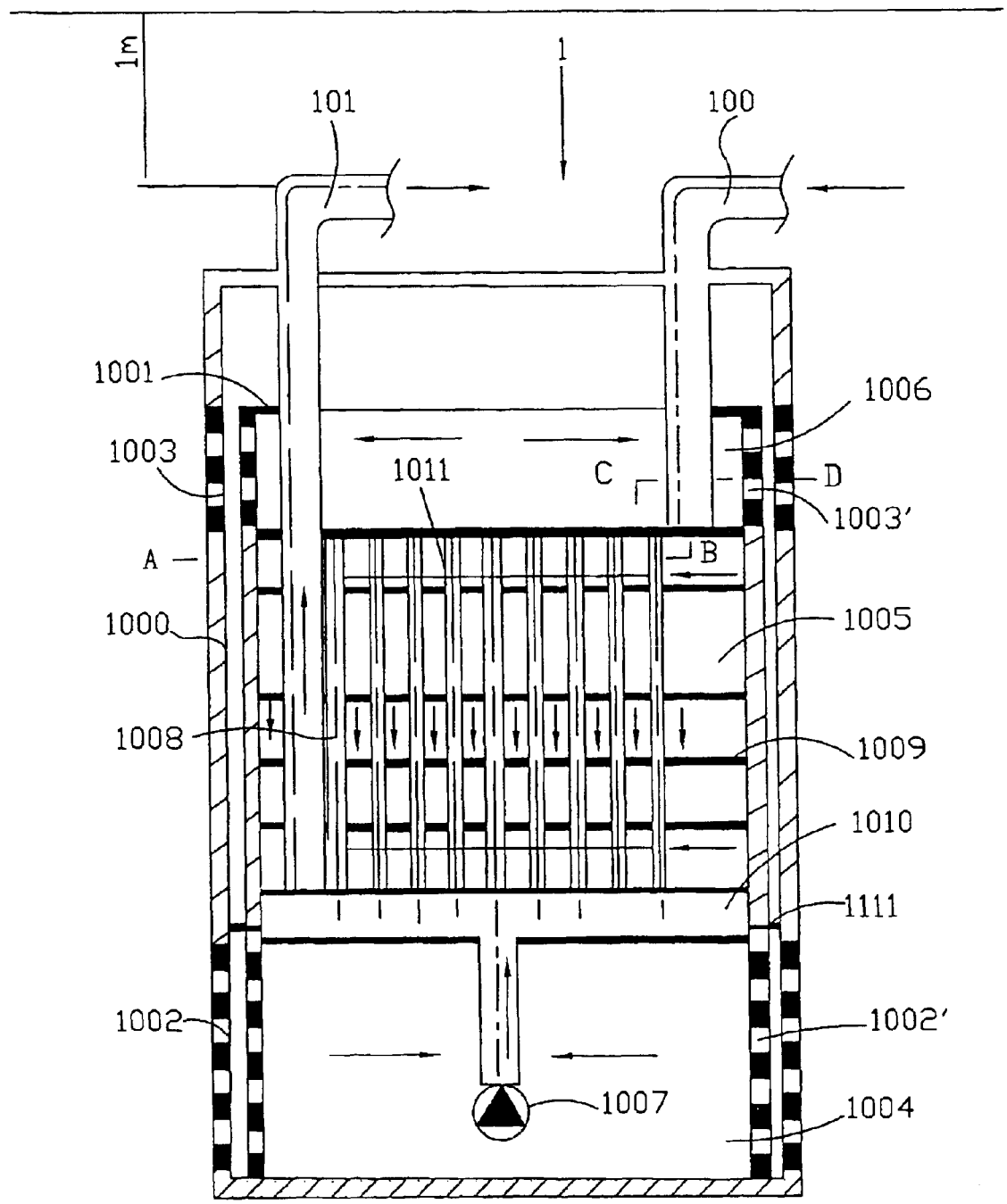
FIG. 1 is a schematic showing the structure of a geothermal heat accumulator of the present invention.
Figure 2:
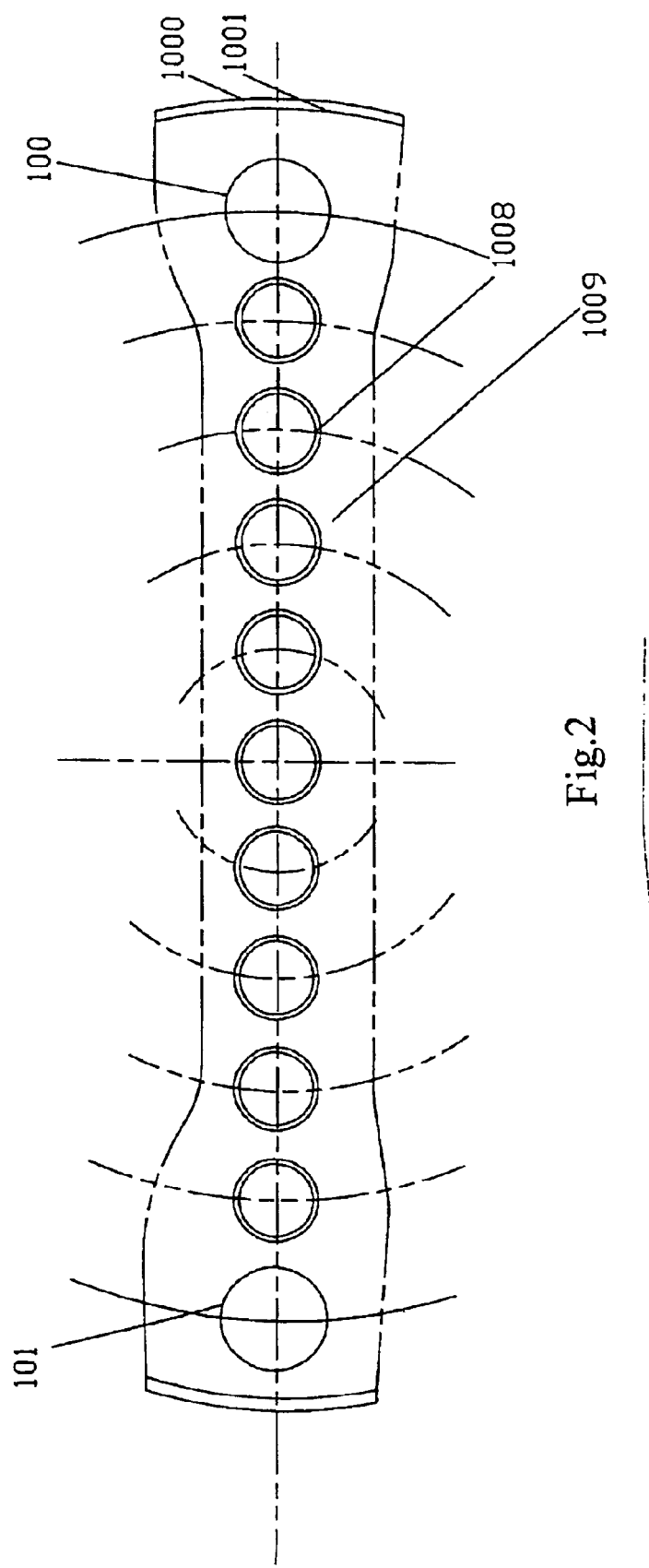
FIG. 2 is a cross-section view taken along line A-B-C-D of the geothermal heat accumulator of the present invention.

Now please refer to FIG. 1 and FIG. 2. FIG. 1 and FIG. 2 are schematic showing the structure of the geothermal heat accumulator of the present invention. The geothermal heat accumulator 1 of the present invention includes a well pipe 1000 and a heat-accumulating pipe 1001 inserted within the well pipe 1000 coaxially, lower portion and upper portion of the well pipe 1000 are provided with inlet holes 1002 and outlet holes 1003 for underground water respectively. The heat-accumulating pipe 1001 is provided with a water-collecting chamber 1004, a diffluent chamber 1010, a heat-exchanging chamber 1005 and a water-accumulating chamber 1006 from the bottom up in sequence. The periphery of each chambers is hermetically connected with inside wall of the heat-accumulating pipe 1001, a submergible pump 1007 is provided in the water-collecting chamber 1004 and communicated with lower portion of the diffluent chamber 1010 by pipelines. The heat-exchanging chamber 1005 is provided with a plurality of heat-exchanging pipes 1008 disposed axially, which are communicated with the diffluent chamber 1010 and the water-accumulating chamber 1006 respectively, and a plurality of baffles 1009 mounted on the outside of the heat-exchanging pipes 1008, peripheries of the baffles 1009 are fixed to the inside wall of the heat-accumulating pipe 1001, gaps 1011 exist between the baffles 1009 and the heat-exchanging pipes 1008, the upper portion of the heat-exchanging chamber 1005 is connected with a returning pipe 100, and the lower portion is connected with a discharging pipe 101, the outer parts of the returning pipe 100 and the discharging pipe 101 which is out of the heat accumulator keeps a distance of at least one meter from the ground level. Water inlet holes 1002' and drain holes 1003' are provided respectively in the side wall of the water-collecting chamber 1004 and the water-accumulating chamber 1006, an isolating ring 1111 is provided between the well pipe 1000 and the heat-accumulating pipe 1001 for separating the water of flowing in from that of flowing out of the well pipe 1000, and the isolating ring 1111 is located at the conjunction of the water-collecting chamber 1004 and the heat-exchanging chamber 1005.

The operating principle is: a vertical hole is dug underground; the well pipe 1000 and the heat-accumulating pipe 1001 are embedded into the vertical hole together. The submergible pump 1007 pumps the water in the water-collecting chamber 1004 to the heat-exchanging pipes 1008. The water releases heat in the heat-exchanging pipes 1008 and then enters into the water-accumulating chamber 1006, then discharges into the stratum passing through the drain holes 1003' of the water-accumulating chamber 1006 and the heat-accumulating pipe 1001, and passing through the outlet hole 1003 of the well pipe 1000. After exchanged heat with the earth in the stratum, the temperature-increased water returns to the water-collecting chamber 1004 through the inlet hole 1002 of the well pipe 1000 and the inlet hole 1002' of the heat-accumulating pipe 1001, thus heat-exchanging performed repeatedly. The isolating ring 1111 provided between the well pipe 1000 and the heat-accumulating pipe 1001 can prevent water from short cycle. On the other hand, the heat-exchanging medium flows into the heat-exchanging chamber 1005 from the returning pipe 100, and flows slowly through the gap 1011 between the baffles 1009 and the heat-exchanging pipes 1008, then performs heat-exchanging with the groundwater in the heat-exchanging pipes 1008, finally flows out through the discharging pipe 101.

The geothermal heat accumulator 1 is placed underground, since the underground earth is a constant temperature zone whose temperature varies little. That is, the underground is warm in winter and cool in summer. The earth transfers cold energy to the geothermal heat accumulator 1 in summer, and transfers heat energy to it in winter.

Figure 3:
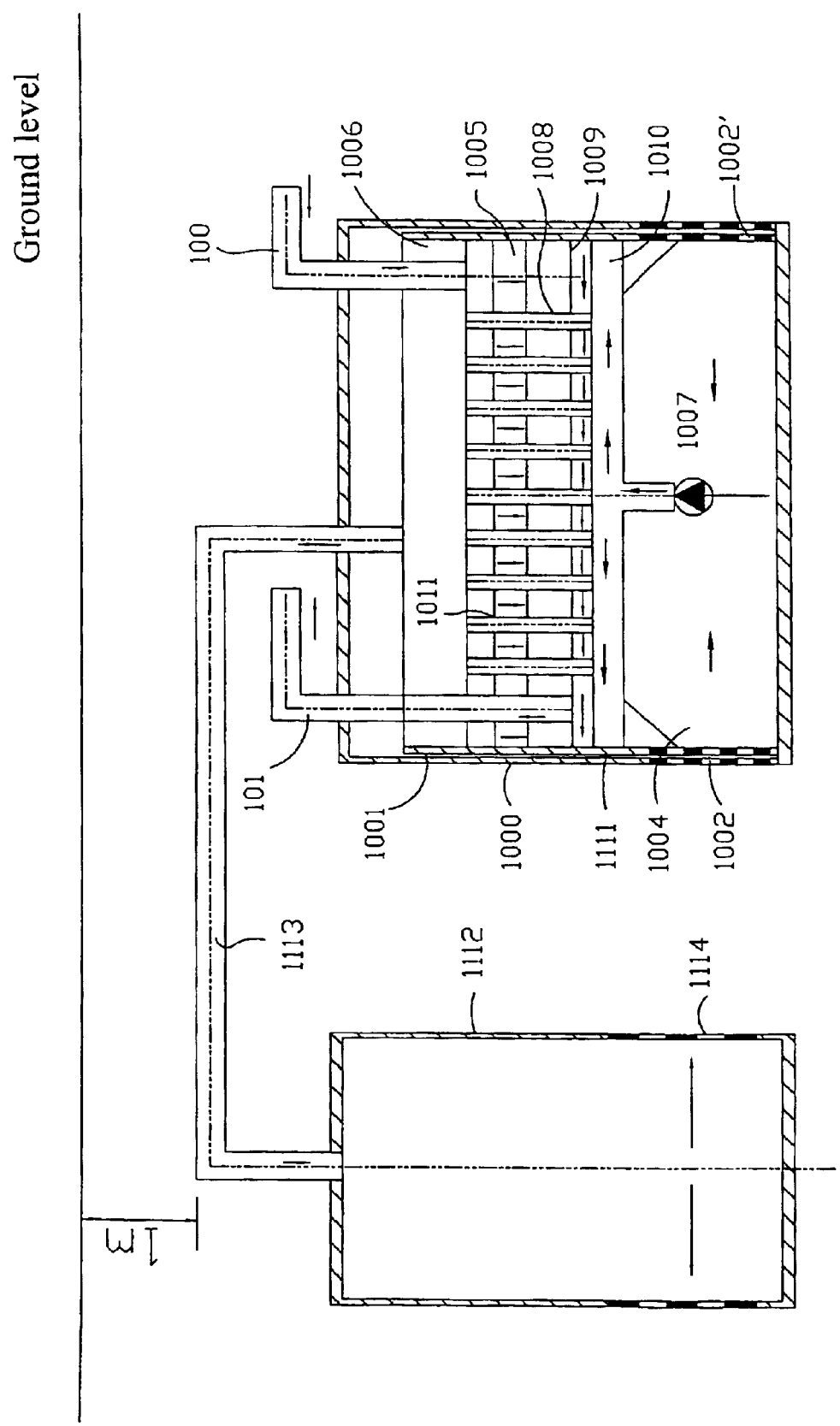
FIG. 3 is a schematic showing the structure of another embodiment of the geothermal heat accumulator of the present invention.

FIG. 3 is an schematic showing the structure of another embodiment of the geothermal heat accumulator of the present invention, in which the structure of the well pipe 1000, heat-accumulating pipe 1001 and the like are basically same as that in the embodiment shown in FIG. 1, and hereinafter do not repeat. Other than that of the embodiment shown in FIG. 1, owing to the geology is different and the seepage of water is slow, a return water tank 1112 is provided by the side of the well pipe 1000 in this embodiment, and outlet holes 1114 are provided in the lower sidewall of the tank 1112. The outlet holes 1003 and drain holes 1003' are not provided in the sidewalls of the well pipe 1000 and heat-accumulating pipe 1001 any more. A drainpipe 1113 is provided above the water-accumulating chamber 1006 and connected with the return water tank 1112. Groundwater is discharged into underground through the return water tank 1112, so that the heat-exchanging between the water and the earth is accelerated.

Figure 4:
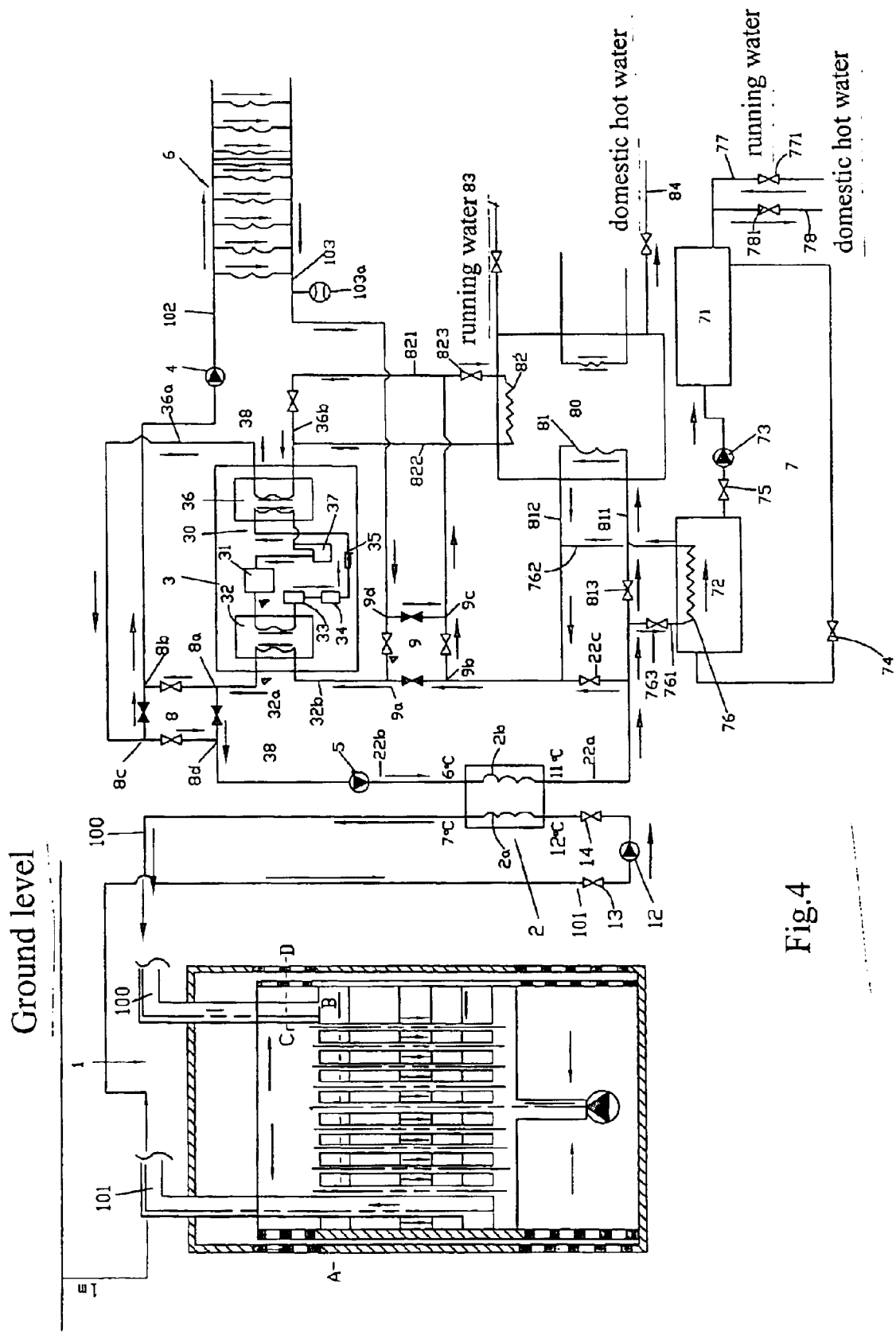
FIG. 4 is a principle schematic showing the first embodiment of the air-conditioning system of accumulating geothermal heat of the present invention.

FIG. 4 is a schematic showing the first embodiment of an air-conditioning system using the geothermal heat accumulator of the present invention. As shown in FIG. 4, the system includes: a geothermal heat accumulator 1, a heat exchanger 2, an energy lift device 3, a discharging pump 4, a returning pump 5 and an air-conditioner 6. In order to increase the fluid flow velocity within the accumulator 1 and enhance the heat exchanger efficiency, a discharging pump 12 of the accumulator is provided in the discharging pipe 101. The heat exchanger 2 can be a conventional plate-type heat exchanger, and the discharging pipe 101 of the accumulator 1 is connected with the inlet side 2a of the heat exchanger 2.

The energy lift device 3 includes a heating cycle 30 and a heat-exchanging cycle 38. The heating cycle 30 is similar with that used in a conventional air-conditioner or a refrigerator. A medium R22 used for heating cycle is charged in the heating cycle 30. The energy lift device 3 includes the heating cycle 30 and the heat-exchanging cycle 38, the heating cycle 30 consists of a compressor 31, a condenser 32, a liquid reservoir 33, a drying filter 34, a restriction choke 35, an evaporator 36 and a gas-liquid separator 37 connected by conduits in sequence. A discharging pipe 32a coupling with the condenser 32 in the heat-exchanging cycle 38 is connected with a first joint 8a of a first two-position-four-way valve 8, a liquid inlet pipe 32b coupling with the condenser 32 in the heat-exchanging cycle 38 is connected with a first joint 9a of a second two-position-four-way valve 9, a discharging pipe 36a coupling with the evaporator 36 in the heat-exchanging cycle 38 is connected with the third joint 8c of the first two-position-four-way valve 8, a liquid inlet pipe 36b coupling with the evaporator 36 in the heat-exchanging cycle 38 is connected with the third joint 9c of the second two-position-four-way valve 9 via connecting conduits 821 of the waste-heat heater 82 to be described later.

A conventional fan-coils can be utilized for air-conditioner 6. The liquid inlet pipe 102 of the air-conditioner 6 is connected with the second joint 8b of the first two-position-four-way valve 8 via the discharging pump 4; the returning pipe 103 of the air-conditioner 6 is connected with the fourth joint 9d of the second two-position-four-way valve 9. An expansion tank 103a is provided in the returning pipe 103 of the air-conditioner 6, which acts as a reservoir for storing increased liquid due to liquid thermal expansion in the heat-exchanging cycle 38.

The liquid inlet pipe 22b at the outlet side 2b of the heat exchanger 2 is connected with the fourth joint 8d of the first two-position-four-way valve 8 via returning pump 5; the discharging pipe 22a at the outlet side 2b of the heat exchanger 2 is connected with the second joint 9b of the second two-position-four-way valve 9 via a stop valve 22c located in the discharging pipe 22a.

The purpose of providing two two-position-four-way valves is that the air-conditioning system of accumulating geothermal heat heat of the present invention can work in the winter as well as in the summer. If it only used for heating in the winter, the two-position-four-way valve may not be needed. At this time, the discharging pipe 32a coupling with the condenser 32 in the heat-exchanging cycle 38 is directly connected with the liquid inlet pipe 102 of the air-conditioner 6 via the discharging pump 4; the returning pipe 103 of the air conditioner 6 is connected with the liquid inlet pipe 32b coupling with the condenser 32 in the heat-exchanging cycle 38, the discharging pipe 36a coupling with the evaporator 36 in the heat-exchanging cycle 38 is directly connected with the returning pipe 22b on the outlet side 2b of the heat exchanger 2 via the returning pump 5, the discharging pipe 22a at the outlet side 2b of the heat exchanger 2 is directly connected with the liquid inlet pipe 36b coupling with the evaporator 36 in the heat-exchanging cycle 38.

Obviously, each of two-position-four-way valves can be substituted with four conventional stop valves that are connected with each other by the means shown in the figures.

In cold weather, when the heat supplied by the geothermal accumulator is insufficient, a solar energy collector 7 can be added to the air-conditioning system of accumulating geothermal heat energy. The solar energy collector can supply an auxiliary heat source to the geothermal accumulator 1 as well as supply hot water for residents. The solar energy collector 7 includes a solar water heater 71, a solar energy reservoir 72 and a water-circulating pump 73 connected by pipelines. An inlet stop valve 74 and an outlet stop valve 75 are arranged in the inlet pipe and outlet pipe of the solar energy reservoir 72 respectively. A heat exchanger 76 is installed in the solar energy reservoir 72. The inlet pipe and outlet pipe 761,762 are connected in parallel on the discharging pipe 22a at the outlet side 2b of the heat exchanger 2. A heat exchanger inlet stop valve 763 is equipped in the inlet pipe 761, and makes the heat exchanger 76 connected with the discharging pipe 22a in parallel to supply auxiliary heat source according to the weather condition.

The solar water heater 71 is connected with a cold water supply inlet pipe 77 and a hot water outlet pipe 78, a water supply stop valve 771 and a hot water outlet stop valve 781 are provided therein respectively.

In cold regions, especially when the weather is very cold, an electrical water heater 80 can be provided as an additional source for the geothermal accumulating air-conditioning system of the present invention while the heat supplied by the geothermal accumulator 1 and the solar energy collector 7 is still insufficient. The electrical water heater 80 includes a transducer 81 which can also employ a plate-type heat exchanger; the inlet pipe and outlet pipe 811,812 of the transducer 81 are connected in parallel with the discharging pipe 22a on the outlet side 2b of the heat exchanger 2. An inlet stop valve 813 is provided in the inlet pipeline 811 of the transducer 81. When the transducer 81 functions, the liquid outlet stop valve 22c can be closed. When the air-conditioning of accumulating geothermal heat system is stopped in the spring and autumn, it is possible for using the electrical water heater to heat hot water. A water supply inlet pipe 83 and a hot water outlet pipe 84 are disposed in the electrical water heater 80. Additionally, a waste-heat heater 82 can be mounted in the electrical water heater 80. The function of the waste-heat heater 82 is that the remaining heat from the prevent invention's geothermal liquid air-conditioner can heat water in the electrical water heater in winter and summer so as to save the electric energy and to supply hot water. A stop valve 823 is mounted at the inlet pipeline 821 of the waste-heat heater 82. When the waste-heat heater 82 is not used, the stop valve 821 can be closed.

Figure 5:
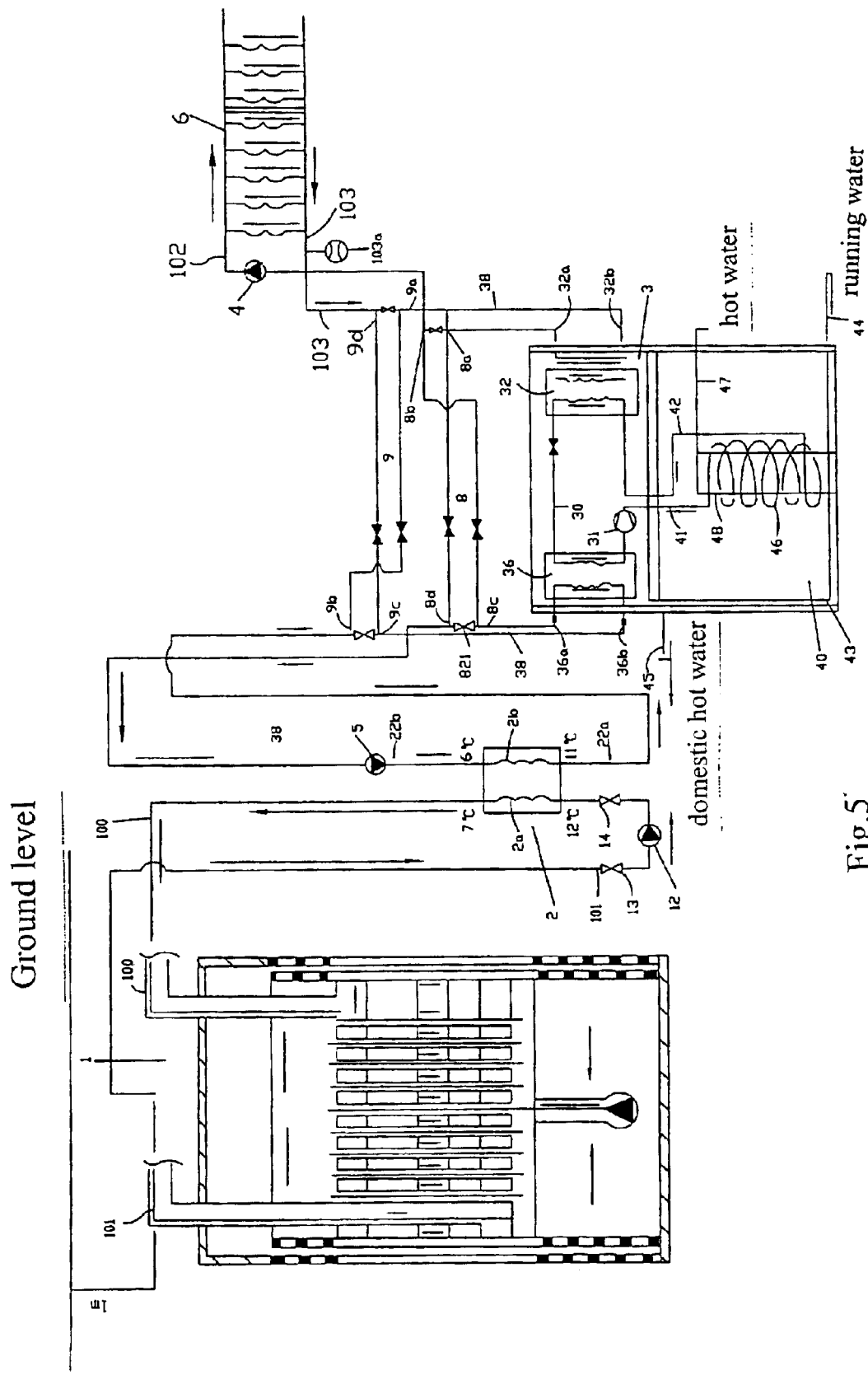
FIG. 5 is a principle schematic showing the second embodiment of the air-conditioning system of accumulating geothermal heat of the present invention.

The air-conditioning system of accumulating geothermal heat shown in FIG. 5 differs from that shown in FIG. 4 in that it removes the solar water heater 71, the solar energy reservoir 72 and the electrical water heater 80 therein, but a water heater 40 is added behind the compressor 31 of the energy lift device 3. Likewise, the system includes the geothermal accumulator 1 underground similar with that shown in FIG. 1, the energy lift device 3, the discharging pump 4, the returning pump 5 and the air-conditioner 6, in which the energy lift device 3 includes a heating cycle 30 and heat-exchanging cycle 38, the heating cycle 30 consists of a compressor 31, a condenser 32, a liquid reservoir 33, a drying filter 34, a restriction choke 35, an evaporator 36 and a gas-liquid separator 37 connected by pipelines in sequence, the condenser 32 and the evaporator 36 of the energy lift device 3 are connected with the geothermal accumulator and the air-conditioner respectively by two two-position-four-way valves 8,9 to form an air-conditioning system.

A discharging pipe 32a coupling with the condenser 32 in the heat-exchanging cycle 38 is connected with a first joint 8a of a first two-position-four-way valve 8, a liquid inlet pipe 32b coupling with the condenser 32 in the heat-exchanging cycle 38 is connected with a first joint 9a of a second two-position-four-way valve 9, a discharging pipe 36a coupling with the evaporator 36 in the heat-exchanging cycle 38 is connected with the third joint 8c of the first two-position-four-way valve 8, a liquid inlet pipe 36b coupling with the evaporator 36 in the heat-exchanging cycle 38 is connected with the third joint 9c of the second two-position-four-way valve 9.

The air-conditioner 6 can adopt conventional fan-coils similar with that shown in FIG. 3 completely. The liquid inlet pipe 102 of the air-conditioner 6 is connected with the second joint 8b of the first two-position-four-way valve 8 via the discharging pump 4; the returning pipe 103 is connected with the fourth joint 9d of the second two-position-four-way valve 9.

The returning pipe 22b at the outlet side 2b of the heat exchanger 2 is connected with the fourth joint 8d of the first two-position-four-way valve 8 through the returning pump 5; the discharging pipe 22a at the outlet side 2b of the heat exchanger 2 is connected with the second joint 9b of the second two-position-four-way valve 9.

Above technical contents are similar with the air-conditioning system of accumulating geothermal heat shown in FIG. 4, the only difference is that the locations of the evaporators and condensers drawn respectively in FIG. 5 and FIG. 4 are opposite.

The energy lift device 3 further includes a water heater 40, a liquid inlet pipe 41 of the water heater 40 is connected with a discharging pipe of the compressor 31, a discharging pipe 42 of the water heater 40 is connected with the liquid inlet pipe of the condenser 32, the water heater 40 is contained in a heat-insulating housing 43, the housing 43 further includes a water supply inlet pipe 44 and a hot water outlet pipe 45. In this embodiment, a portion 46 of the inlet pipe 41 within the heater 40 is formed as helix shape, and the helix inlet pipe 46 is provided around a self-circular boiled water unit 48 having an inlet pipe 44 and an outlet pipe 47.

Now referring to the figures to describe the operation of the air-conditioning system of accumulating geothermal heat of the present invention, which can supply hot water. We can refer to FIG. 4 and FIG. 5. In the first two-position-four-way valve 8 and the second two-position-four-way valve 9, black portions denote closed flow paths. Blank portions denote opened flow paths.

In the winter, as described above, the geothermal accumulator 1 increases the temperature of water in the accumulator, the discharging pump 12 supplies the warm-up water to the inlet side 2a of the heat exchanger 2 through the valves 13, 14, then water transfers heat to the outlet side 2b by the heat exchanger. Water in the outlet side 2b is supplied to the heat-exchanging cycle 38 coupled with the evaporator 36 through the second two-position-four-way valve 9, pipes 821 and 36b. In the evaporator 36, heat exchanging is performed, and the heat is transferred to the evaporator 36. The heat-exchanged liquid flows back to the heat exchanger 2 through the discharging pipe 36a, first two-position-four-way valve 8, returning pump 5 and returning pipe 22b. In the meantime, medium R22 vaporizing in the evaporator 36 becomes gas with lower temperature and pressure and then is transferred into the separator 37, after gas-liquid separated in the separator 37, the gas is transferred to the compressor 31. The gas with lower temperature and pressure becomes gas with high temperature and pressure in the compressor, and then is discharged to the condenser 32 through the liquid inlet pipe 46 in the water heater 40. In the condenser 32, the high temperature and pressure gas discharged from the compressor 31 performs heat-exchanging with medium in the heat-exchanging cycle 38 coupling with the condenser 32, after heat exchanging, the heated liquid medium flows into the air-conditioner 6 through discharging pipe 32a, first two-position-four-way valve 8, discharging pump 4 and liquid inlet pipe 102 of the air-conditioner 6 to warm up the indoor air. The liquid medium cooled in the air-conditioner flows back to the heat-exchanging cycle 38 coupled with the condenser 32 through the returning pipe 103, second two-position-four-way valve 9 and liquid inlet pipe 32b, so that a cycle is achieved.

When refrigerating in summer, the first two-position-four-way valve 8 and the second two-position-four-way valve 9 should be reversed. That is to say, the black flow path should exchange with the blank flow path of the first and second two-position-four-way valves, and the opened and closed joints just opposite to that shown in the figures. In which, the first two-position-four-way valve 8 communicates the discharging pipe 36a in the heat-exchanging cycle 38 coupled to the evaporator 36 with the inlet pipe 102 of the air-conditioner, and communicates the outlet pipe 32a in the heat-exchanging cycle 38 coupled to the condenser 32 with the return pipe 22b of the heat exchanger 2; simultaneously, the second two-position-four-way valve 9 communicates the liquid inlet pipe 36b in the heat-exchanging cycle 38 coupled with the evaporator 36 with the returning pipe 103 of the air-conditioner 6, and communicates the inlet pipe 32b in the heat-exchanging cycle 38 coupled with the condenser 32 with the outlet pipe 22a of the heat exchanger 2, so that the cold medium in the heat-exchanging cycle 38 coupled with the evaporator 36 communicates with the air-conditioner so as to supply cooled air to the room.

In order to supply hot water for drink or rinse, while the air-conditioning system of accumulating geothermal heat of present invention supplies cool or heat to the indoor, the high temperature and pressure liquid in the outlet pipe of the compressor 31 constantly heats water in the boiled water unit 48 and the water heater 40 through the helix inlet pipe 46 of the water heater 40.

Industrial Application

The air-conditioning system of accumulating geothermal heat according to present invention can utilize the low level cold or heat energy source existed conventionally underground, and the system can only consume little electrical energy to meet people's needs for heating and cooling. This system is applicable to a heating and cooling system for residence, hotel, restaurant, building, etc and can supply hot water for rinse and drink.

What is claimed is:

1. A geothermal accumulator, characterized in that it includes a well pipe and a heat-accumulating pipe inserted within the well pipe coaxially, the lower portion and the upper portion of the well pipe are provided with inlet holes and the outlet holes for underground water respectively, said heat-accumulating pipe is provided with a water-collecting chamber, a diffluent chamber, a heat-exchanging chamber and a water-accumulating chamber from the bottom up in sequence, a submergible pump is provided in the water-collecting chamber and is communicated with lower portion of the diffluent chamber by pipelines, the heat-exchanging chamber is provided with a plurality of axially disposed heat-exchanging pipes communicating with the diffluent chamber and the water-accumulating chamber respectively, and a plurality of baffles attached to the outside of the heat-exchanging pipes, the peripheries of the baffles are fixed to the inside wall of the heat-accumulating pipe, gap exists between the baffles and the heat-exchanging pipes, the upper portion of the heat-exchanging chamber is connected with a returning pipe, and the lower portion is connected with a discharging pipe, water inlet holes and drain holes are provided respectively in the side wall of the water-collecting chamber and the water-accumulating chamber, an isolating ring is provided between the well pipe and the heat-accumulating pipe and is located at the conjunction of the water-collecting chamber and the heat-exchanging chamber.

2. A geothermal accumulator, characterized in that includes a well pipe and a heat-accumulating pipe inserted within said well pipe coaxially, inlet holes are provided respectively in the side walls of lower portion of said well pipe and the heat-accumulating pipe, said heat-accumulating pipe is provided with a water-collecting chamber, a diffluent chamber, a heat-exchanging chamber and a water-accumulating chamber from the bottom up in sequence, a submergible pump is provided in the water-collecting chamber and is communicated with lower portion of the diffluent chamber by a pipeline, the heat-exchanging chamber is provided with a plurality of axially disposed heat-exchanging pipes communicated with the diffluent chamber and water-accumulating chamber respectively, and a plurality of baffles attached to the outside of the heat-exchanging pipes, the peripheries of said baffles are fixed to inside wall of the heat-accumulating pipe, gap exists between the baffles and the heat-exchanging pipes, the upper portion of the heat-exchanging chamber is connected with a returning pipe, and the lower portion is communicated with a discharging pipe, an isolating ring is provided between the well pipe and the heat-accumulating pipe and is located at the conjunction of the water-collecting chamber and the heat-exchanging chamber, drainpipe is provided above said water-accumulating chamber and is communicated with the return water tank which position side by side with the well pipe, drain holes are provided in the lower sidewall of the return water tank.

3. A air-conditioning system of accumulating geothermal heat using the geothermal accumulator of claim 1, characterized in that: it includes: said geothermal accumulator located underground, a heat exchanger, an energy lift device, a discharging pump, a returning pump and an air-conditioner, a discharging pump of the accumulator is provided in the discharging pipe which is connected with the inlet side of the heat exchanger, said energy lift device includes a heating cycle and a heat-exchanging cycle, the heating cycle consists of a compressor, a condensers, a liquid reservoirs, a drying filter, a restriction choked, an evaporator and a gas-liquid separator connected by pipelines in sequence, a discharging pipe in the heat exchange cycle coupling with the condenser is connected with the air-conditioner through the liquid inlet pipe of the air-conditioner and the discharging pump, the returning pipe of said air-conditioner is connected with the liquid inlet pipe coupling with said condenser in the heat exchange cycle, the discharging pipe coupling with said evaporator in the heat-exchanging cycle is connected with the returning pipe at the outlet side of the heat exchanger through the returning pump, the discharging pipe at the outlet side of the heat exchanger is connected with the liquid inlet pipe coupling with the evaporator in the heat exchange cycle.

4. The air-conditioning system of accumulating geothermal heat according to claim 3, in which said energy lift device further includes a water heater, a liquid inlet pipe of said water heater is connected with the discharging pipe of the compressor, the discharging pipe of said water heater is connected with the liquid inlet pipe of the condenser, said water heater is contained in a heat-insulating housing, said housing is further provided with a water supply inlet pipe and a hot water outlet pipe.

5. The air-conditioning system of accumulating geothermal heat of claim 4, in which a portion of the inlet pipe within said heater is formed as a helix pipe, said helix inlet pipe is provided around a self-circular boiled water unit having inlet and outlet pipes.

6. The air-conditioning system of accumulating geothermal heat according to claim 3, in which the system further includes two two-position-four-way valves, the discharging pipe coupling with said condenser in the heat exchange cycle is connected with a first joint of the first two-position-four-way valve, the liquid inlet pipe is connected with a first joint of the second two-position-four-way valve; the liquid inlet pipe of the air-conditioner is connected with the second joint of the first two-position-four-way valve; the returning pipes of the air-conditioners is connected with the fourth joint of the second two-position-four-way valve; a discharging pipe coupling with the evaporator in the heat-exchanging cycle is connected with a third joint of the first two-position-four-way valve, a liquid inlet pipe is connected with a third joint of the second two-position-four-way valve; the liquid inlet piped at the outlet side of said heat exchanger is connected with the fourth joints of the first two-position-four-way position-four-way valve, the discharging piped is connected with the second joint of the second two-position-four-way valve.

7. The air-conditioning system of accumulating geothermal heat according to claim 6, in which the system further includes a solar energy collectors, said solar energy collector includes a solar water heaters, a solar energy reservoirs and a circulating pumps connected by pipelines in sequence to form a cycle, an inlet stop valve and an outlet stop valve is arranged in the inlet pipe and outlet pipe of the solar energy reservoirs respectively, a heat exchanger is provided in the solar energy reservoirs, an inlet pipe and an outlet pipe of the heat exchangers are connected in parallel with the discharging pipes at the outlet side of the heat exchangers, a heat exchanger inlet stop valve is connected with the inlet pipe.

8. The air-conditioning system of accumulating geothermal heat according to claim 7, in which the solar water heater is connected with an inlet piped for water supply and an outlet piped for domestic hot water, a water supply stop valved and a hot water outlet stop valve are provided in the inlet pipe and the outlet pipe respectively.

9. The air-conditioning system of accumulating geothermal heat according to claim 8, in which the system also includes an electrical water heater, said electrical water heater includes a transducers, an inlet pipe and outlet pipe of said transducer are connected in parallel with the discharging piped on the outlet sided of the heat exchangers, an inlet stop valved is provided in the inlet pipelines of said transducer.

10. The air-conditioning system of accumulating geothermal heat according to claim 9, in which a waste-heat heaters is located in the electrical water beater, the inlet and the outlet pipeline are connected in parallel with the liquid inlet pipe coupling with said evaporator in the heat-exchanging cycled, a stop valve is in the inlet pipeline or the outlet pipeline of said waste-heat heater.

11. The air-conditioning system of accumulating geothermal heat according to claim 10, in which portions of the returning piper and the discharging pipe of the heat-accumulating pipe, which extending out of the geothermal accumulator, keep a distance of at least 1 meter from the ground level.

12. The air-conditioning system of accumulating geothermal heat according to claim 5, in which the system further includes two two-position-four-way valves, the discharging pipe coupling with said condenser in the heat exchange cycle is connected with a first joint of the first two-position-four-way valve, the liquid inlet pipe is connected with a first joint of the second two-position-four-way valve; the liquid inlet pipe of the air-conditioner is connected with the second joint of the first two-position-four-way valve; the returning pipe of the air-conditioner is connected with the fourth joint of the second two-position-four-way valve; a discharging pipe coupling with the evaporator in the heat-exchanging cycle is connected with a third joint of the first two-position-four-way valve, a liquid inlet pipe is connected with a third joint of the second two-position-four-way valve; the liquid inlet pipe at the outlet side of said heat exchanger is connected with the fourth joint of the first two-position-four-way valve, the discharging pipe is connected with the second joint of the second two-position-four-way valve.

* * * * *